United States Patent [19]
Yoda

[11] Patent Number: 4,939,711
[45] Date of Patent: Jul. 3, 1990

[54] ARRANGEMENT FOR MINIMIZING EFFECTS OF LEAKAGE MAGNETIC FIELDS IN OPTOMAGNETIC RECORDING/REPRODUCING APPARATUS

[75] Inventor: Yoshiro Yoda, Tokyo, Japan

[73] Assignee: Olympus Optical Co., Ltd., Tokyo, Japan

[21] Appl. No.: 159,760

[22] Filed: Feb. 24, 1988

[30] Foreign Application Priority Data

Mar. 3, 1987 [JP] Japan .................. 62-48177

[51] Int. Cl.⁵ .................. G11B 13/04; G11B 11/12
[52] U.S. Cl. .................. 369/13; 369/44.11; 369/44.21; 369/44.31; 360/114
[58] Field of Search .................. 369/13, 45, 290; 360/59, 114; 365/122

[56] References Cited

U.S. PATENT DOCUMENTS 4,660,190 4/1987 Fujii et al. .................. 369/13
4,672,594 6/1987 Kato et al. .................. 369/13

FOREIGN PATENT DOCUMENTS 58-200407 5/1982 Japan.
59-48803 3/1984 Japan.
60-50702 3/1985 Japan.

Primary Examiner—Steven L. Stephan
Assistant Examiner—Hoa Nguyen
Attorney, Agent, or Firm—Frishauf, Holtz, Goodman & Woodward

[57] ABSTRACT

In an optomagnetic recording/reproducing apparatus, an objective lens is actuated by a lens actuator having focusing and tracking magnetic circuits so that a light beam is focused on an optical disk and is directed to a predetermined area of the optical disk. The lens actuator is mounted on a pickup body which is driven in a radial direction of the disk by a driving magnetic circuit. The optical disk is clamped on a turntable by a magnetic clamp mechanism. First leakage magnetic fields produced from each of the focusing and tracking magnetic circuits, second leakage magnetic fields are produced from the driving magnetic circuit and the magnetic clamp mechanism, and the first and second magnetic fields are directed in mutually opposite directions relative to the optical disk.

10 Claims, 3 Drawing Sheets

ARRANGEMENT FOR MINIMIZING EFFECTS OF LEAKAGE MAGNETIC FIELDS IN OPTOMAGNETIC RECORDING/REPRODUCING APPARATUS

BACKGROUND OF THE INVENTION

1. Field of the Invention

The present invention relates to an optomagnetic recording/reproducing apparatus and, more particularly, to an improvement in a magnetic circuit arranged in an optomagnetic recording/reproducing apparatus.

2. Description of the relating art

An optomagnetic recording/reproducing device has been recently developed as an information recording/reproducing device capable of optically recording, reproducing, or erasing information. A conventional optomagnetic recording/reproducing apparatus, for example, comprises an information recording medium composed of a magnetic thin film magnetized perpendicularly to its surface. In such an apparatus, predetermined information is recorded or erased such that the directions of magnetic moments in the information recording medium are inverted by the effects of a light beam and an external magnetic field. Information stored in the information recording medium is read out by utilizing the photo-electromagnetic effect which is known as the Faraday effect and the Kerr effect, i.e., that the angle of polarization defined by light incident onto the information recording medium and light emitted therefrom changes in accordance with stored information. For example, in the information recording mode, a light beam is locally incident onto a predetermined area of a recording surface. When the temperature of the area is raised over the Curie point, a magnetic field larger than the coercive force of a magnetic material of the local area and smaller than the coercive force of other areas is externally applied in order to invert the magnetic moments in the local area, thereby recording information. In the information erase mode, a light beam is incident onto a predetermined area of the recording medium. When the temperature of the area is raised over the Curie point, an external magnetic field larger than the coercive force of the magnetic material is uniformly applied from a predetermined direction in order to uniformly align the directions of the magnetic moments, thereby erasing information. The optomagnetic recording/reproducing apparatus comprises the information recording medium, a light source for emitting a light beam on the information recording medium, a detector for receiving the light beam from the information recording medium, and the like. In addition, a magnetic field must be externally applied to a recording surface irradiated with a light beam, as described above. For this reason, a bias magnetic field generator is also arranged in the device. Such a bias magnetic field generator is disclosed in Japanese Patent Disclosure (Kokai) No. 58-200407.

Various improvements in the bias magnetic field generator have been introduced in order to effectively generate a magnetic field. For example, FIG. 1A shows a generator, in which a coil is simply wound around a light pickup member, and the resultant pickup assembly is located above a surface of recording medium 3 so as to oppose it. FIG. 1B shows a generator in which magnetic material 4 is arranged to concentrate the magnetic field generated by coil 2. FIG. 1C shows a generator in which permanent magnet 5 extends along a recording area of recording medium 3.

FIG. 2 is a schematic view of a structure of an optomagnetic recording/reproducing apparatus comprising a bias magnetic field generator. Disk-like recording medium 6 (to be referred to as disk 6 hereinafter) is supported, on turntable 8 coupled to motor 7, by clamp member 9, and is rotated at a predetermined speed in accordance with driving of motor 7. In addition, pickup 10 is arranged so as to oppose a recording surface of disk 6. Pickup 10 can be moved by driver 11 along the radial direction of disk 6. Bias magnetic field generator 12 is located above disk 6, whereas pickup 10 is located below disk 6.

In the optomagnetic recording/reproducing apparatus, magnetic fields are generated by units other from bias magnetic field generator 12. For example, a lens actuator in pickup 10, clamp member 9, and driver 11 generate magnetic fields. The lens actuator comprises a coil and a magnet to displace an objective lens for controlling a focusing position of the light beam. For this purpose, the magnetic field is generated by the coil and magnet. A magnet is used for clamp member 9 to support disk 6 by utilizing the attraction force of the magnet, and a magnetic field is generated by clamp member 9. In addition, when a magnetic driver called a VCM (voice coil motor) is used as driver 11, a magnetic field is generated. Thus, leakage magnetic fields are generated by several magnetic field generating elements other from the bias magnetic field generator.

The intensities of the leakage magnetic fields from these magnetic field generating elements have been actually measured. From the results, it was found that the intensity of the magnetic field generated by the lens actuator is about 100 Oe, and the clamp member and the VCM respectively generate the magnetic fields of the order of several tens Oe. Hitherto, these leakage magnetic fields have been considered negligibly low in intensity, as compared with the magnetic field generated by the bias magnetic field generator. However, their total intensity, which amounts to several hundred Oe, is far from negligible. More specifically, unless the leakage magnetic fields, which have been generated by the magnetic field-generating elements and extend in different directions, completely cancel out one another, a leakage magnetic field exists, which inevitably interferes with the bias magnetic field. As a consequence, the bias magnetic field is attenuated in the direction perpendicular to the recording surface of medium 6, and becomes too weak to generate a sufficiently strong magnetic field for recording data on recording medium 6. In order to obtain a desired magnetic field, a larger current may be supplied to a coil for generating the bias magnetic field. In this case, however, the coil is heated, thus posing another problem. In addition, the number of turns may be increased to generate a required bias magnetic field. In this case, however, the size of the unit is increased.

SUMMARY OF THE INVENTION

It is an object of the present invention to provide an optomagnetic recording/reproducing apparatus comprising a small-sized bias magnetic field generator, wherein a small amount of heat is generated by effectively utilizing a magnetic field generated by the bias magnetic field generator.

An optomagnetic recording/reproducing apparatus according to the present invention comprises a light source for generating a light beam, focusing means for focusing the light beam emitted from the light source, a recording medium having a recording surface to be irradiated with the light beam focused by the focusing means, pickup means for detecting the light beam from the recording medium, bias magnetic field generating means for applying a bias magnetic field onto the recording medium, and magnetic field generating means for generating first and second magnetic fields substantially perpendicular to the recording surface of the recording medium irradiated with the light beam, the first and second magnetic fields being directed in the opposite directions on the recording surface.

According to the present invention, since the leakage magnetic fields which are generated by magnetic field generating elements and interfere with the bias magnetic field generated by the bias magnetic field generator are decreased, the magnetic field generated by the bias magnetic field generator can be efficiently used, thereby providing a small-sized, inexpensive bias magnetic field generator. In addition, when a coil is used as the bias magnetic field generator, a current to be supplied to the coil can be decreased, and hence the amount of heat generated by the coil can be reduced.

DETAILED DESCRIPTION OF THE PREFERRED EMBODIMENT

Figure 1A:
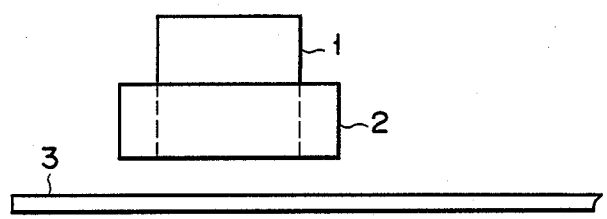
FIG. 1A, 1B, and 1C: are schematic views of structures of conventional bias magnetic field generators.
Figure 1B:
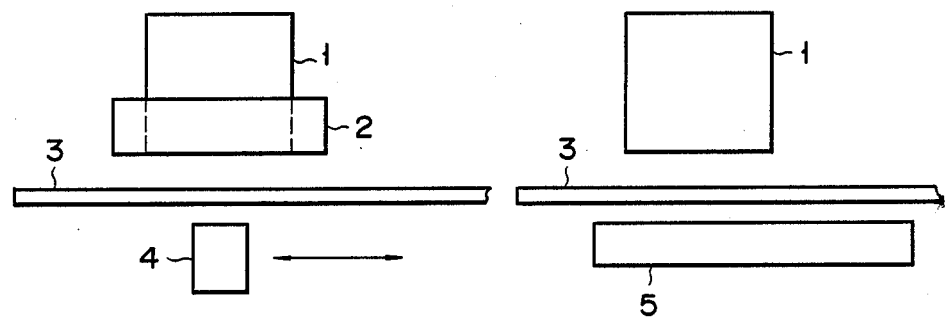
Figure 1C:
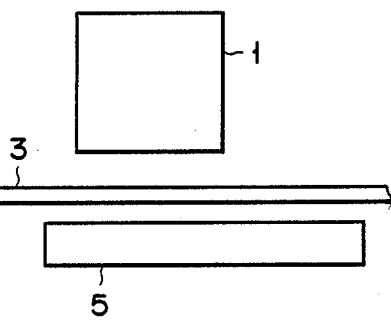
Figure 2:
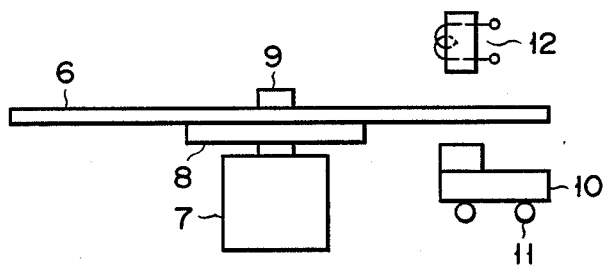
FIG. 2 is a schematic view of an optomagnetic recording/reproducing device using a disk.
Figure 3:
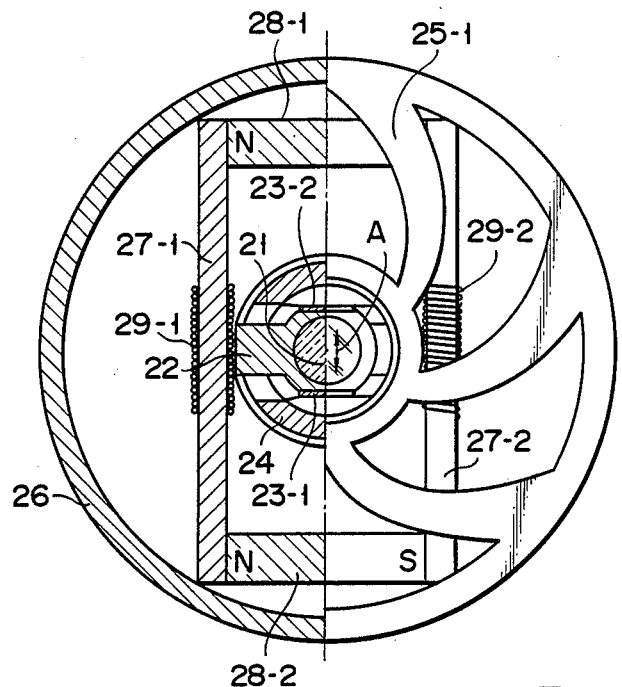
FIG. 3 is a plan view showing a partially cutaway view of a lens actuator according to an embodiment of the present invention.
Figure 4:
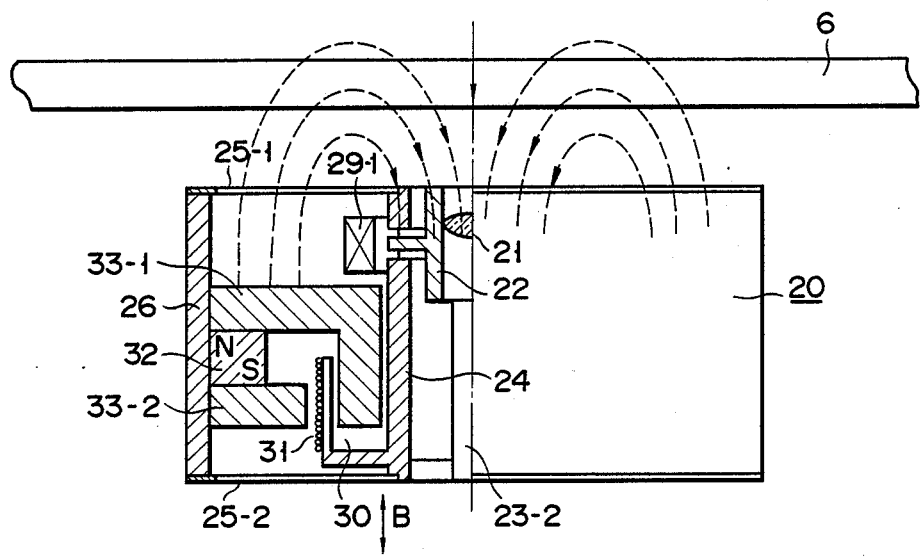
FIG. 4 is a side view showing a partially cutaway view of the lens actuator according to the embodiment of the present invention.

FIGS. 3 and 4 show lens actuator 20 according to an embodiment of the present invention.

Referring to FIGS. 3 and 4, objective lens 21 is fixed inside cylindrical lens support frame 22 composed of a magnetic material. The lower end of lens support frame 22 is coupled to cylindrical inner frame 24 through two leaf springs 23-1 and 23-2 arranged to be parallel. The upper and lower ends of inner frame 24 are respectively coupled to the upper and lower ends of outer frame 26 through circular springs 25-1 and 25-2. Leaf springs 23-1 and 23-2 for supporting support and inner frames 22 and 24 are mounted to be resiliently displaceable in a tracking direction (direction A). Circular springs 25-1 and 25-2 for supporting inner and outer frames 24 and 26 are mounted to be resiliently displaceable in a focus direction (direction B).

The end portions of square pillar-like permanent magnets 28-1 and 28-2, and those of square pillar-like yokes 27-1 and 27-2 are coupled to each other, such that these components 28-1, 28-2, 27-1 and 27-2 surround lens support frame 22. Tracking coils 29-1, 29-2 are respectively wound around yokes 27-1 and 27-2 at substantially central portions thereof in the longitudinal direction. They are used as a tracking magnetic circuit for moving lens support frame 22 in the tracking direction (direction A).

Collar-like ring 30 having focusing coil 31 wound around its distal end extends from the lower end portion of inner frame 24 composed of a magnetic material. Ring 30 is inserted into a gap between the distal ends of yokes 33-1 and 33-2 extending from permanent magnet 32 fixed to an inner wall of outer frame 26. These parts constitute a focusing magnetic circuit for moving support frame 22 in the focusing direction (direction B).

An operation of each magnetic circuit with the above arrangement in lens actuator 20 will be described. A light beam passing through a pickup optical system to be described later is focused through objective lens 21 in a hollow portion of inner frame 24 and is radiated onto disk 6. The focusing position of the light beam is controlled by the focusing magnetic circuit. More specifically, a focusing state on disk 6 is detected by a detector (not shown) and converted into a focusing electrical signal. This focusing electrical signal is processed by a signal processing circuit (not shown), and a current signal for providing a predetermined focusing state is fed back to focusing coil 31. A magnetic field is generated at ring 30 in accordance with the signal supplied to focusing coil 31. This magnetic field and a magnetic field generated at a gap between yokes 31-1 and 31-2 interact with each other, and inner frame 24 is driven. In response to driving of inner frame 24, objective lens 21 is driven in the focusing direction (direction B) through leaf springs 23-1 and 23-2, and lens support frame 22.

The tracking position of the light beam is controlled by the tracking magnetic circuit. The tracking position on disk 6 is detected by a detector (not shown) and converted into a tracking position electric signal. The tracking position electrical signal is processed by a signal control circuit (not shown), and a current signal for providing a predetermined tracking position is fed back to tracking coils 29-1 and 29-2. A magnetic field is generated at yokes 27-1 and 27-2 in accordance with the signal supplied to tracking coils 29-1 and 29-2. This magnetic field and lens support frame 22 composed of a magnetic material interact with each other, and lens support frame 22 is driven to a predetermined position in the tracking direction (direction A).

Accordingly, when the tracking and focusing positions are to be controlled, a magnetic field is generated by each magnetic circuit. If the N pole of permanent magnet 32 is located at an upper position, as shown in FIG. 4, a leakage magnetic field indicated by dotted lines is generated by the focusing magnetic circuit, and a downward magnetic field is generated on the recording medium irradiated with the light beam. This leakage magnetic field and a magnetic field generated by the bias magnetic field generator 12 interface with each other in the optomagnetic recording/reproducing apparatus. As a result, the performance of the apparatus is degraded. For this reason, in order to minimize the leakage magnetic field especially in a direction perpendicular to the recording surface, other magnetic field generating elements to be described later must be arranged. Note that although a leakage magnetic field is also generated by the tracking magnetic circuit, its component perpendicular to the recording surface of the recording medium is negligibly small.

Figure 5:
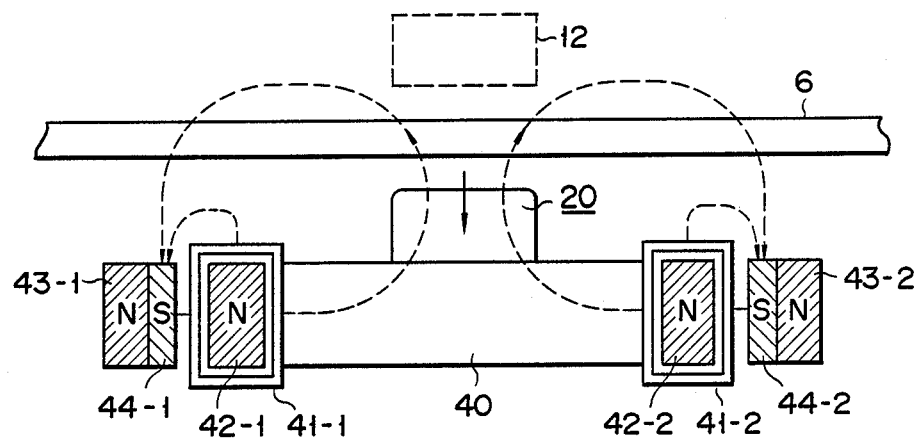
FIG. 5 is a sectional view of a VCM according to the embodiment of the present invention.

A pickup driver according to the embodiment of the present invention will be described with reference to FIG. 5. The pickup driver serves to move pickup body 40 in a radial direction of disk 6, and is constituted by, e.g., a VCM (voice coil motor). As is shown in FIG. 5, lens actuator 20 is mounted on pickup body 40. VCM coils 41-1 and 41-2, each being a hollow cylinder having a rectangular cross section, are attached to the ends of pickup body 40, respectively, such that both VCM coils extend perpendicular to the plane of the figure. Front yoke 42-1 is slidably inserted in VCM coil 41-1 and extends perpendicular to the plane of the figure. Permanent magnet 44-1 is located besides VCM coil 41-1, and back yoke 43-1 having a rectangular cross section is attached to that side of magnet 44-1 which faces away from VCM coil 41-1. Front yoke 42-1 and back yoke 43-1 are connected to each other, thereby forming a loop. Front yoke 42-2 is slidably inserted in VCM coil 41-2 and extends perpendicular to the plane of the figure. Permanent magnet 44-2 is located besides VCM coil 41-2, and back yoke 43-2 having a rectangular cross section is attached to that side of magnet 44-2 which faces away from VCM coil 41-1. Front yoke 42-2 and back yoke 43-2 are connected to each other, thereby forming a loop. Pickup body 40 and both VCM coils 41-1 and 41-2 are can be moved together, guided by a guide member (not shown), in parallel to the axes of front yokes 42-1 and 42-2, that is, in the radial direction of disk 6.

Yokes 42-1, 42-2, 43-1, and 43-2, permanent magnets 44-1 and 44-2, and VCM coils 41-1 and 41-2 constitute a magnetic circuit for driving pickup body 40 in the radial direction of disk 6.

With the above arrangement, when a current is supplied to VCM coils 41-1 and 41-2, a magnetic field is generated from the front yokes. Inconsequence, pickup body 40 is driven in the radial direction of disk 6 by the interaction between the magnetic field and the permanent magnets.

As described above, in order to maintain the function of the device, leakage magnetic fields must be minimized. For this purpose, for example, assume that the leakage magnetic field generated by lens actuator 20 is perpendicular to the recording surface in the downward direction, as shown in FIG. 5. Then, a magnetic circuit for the VCM is arranged such that the leakage magnetic field therefrom is directed upward so as to cancel the leakage magnetic field from lens actuator 20. More specifically, if permanent magnets 44-1 and 44-2 are set at the S pole, and front and back yokes 42-1, 42-2, 43-1, and 43-2 are set at the N pole, the leakage magnetic fields are generated by the magnetic circuit for the VCM in a direction indicated by an arrow of dotted line. Thus, an upward magnetic field perpendicular to the recording surface is generated at a position where the light beam is incident, and the leakage magnetic field from lens actuator 20 is canceled.

Figure 6:
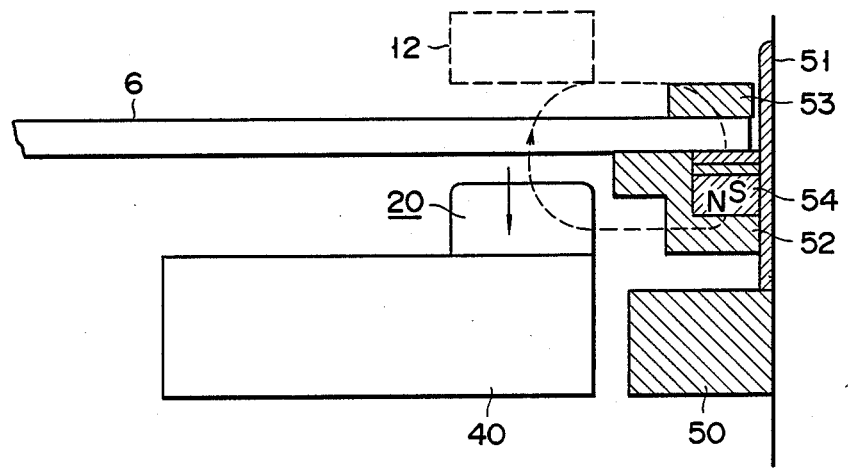
FIG. 6 is a sectional view of a clamp member according to the embodiment of the present invention.

FIG. 6 shows an embodiment of a clamp member according to the present invention. Disk-like turntable 52 is fixed to spindle shaft 51 coupled to a rotary shaft of spindle motor 50. Disk 6 conveyed by an optical disk moving unit (not shown) is arranged on turntable 52 while being fitted on spindle shaft 51. Disk 6 is urged by clamp hub 53 from above, and is supported on turntable 52. In synchronism with the rotation of the motor of spindle shaft 51, clamp hub 53 is rotated with disk 6. Clamp hub 53 is preferably made of a magnetic material. Doughnut-like permanent magnet 54 is arranged in a hollow portion of turntable 52. With this arrangement, the magnetic attraction acts between clamp hub 53 and permanent magnet 54, and hence disk 6 is tightly supported on turntable 52.

Accordingly, when permanent magnet 54 is arranged to support disk 6, a leakage magnetic field is generated. As described above, since it is preferable that the polarity of permanent magnet 54 is set so as to minimize the leakage magnetic field perpendicular to the recording surface, the S pole of permanent magnet 54 is located at an upper position in turntable 52. With this arrangement, a leakage magnetic field is generated by clamp member in a direction indicated by an arrow of solid line. As a result, the upward magnetic field perpendicular to the recording surface is generated at a position where the light beam is incident, thereby canceling the leakage magnetic field from lens actuator 20.

According to the embodiment, it is assumed that the leakage magnetic field from lens actuator 20 is larger than the leakage magnetic fields from the magnetic circuit for the VCM and the clamp member. However, if the leakage magnetic field from the lens actuator 20 is smaller than them, the polarities of the permanent magnets arranged in the magnetic circuit for VCM and the clamp member are changed in accordance with the difference between their values, thereby minimizing the leakage magnetic field applied onto the disk. In addition, even if magnetic field generating members other than those described in the embodiment, e.g., a magnetic sensor for detecting the rotational speed of a disk, and the like are used, leakage magnetic fields applied onto the disk can be minimized by directing each magnetic field so as to minimize the total intensity of the leakage magnetic fields. If leakage magnetic fields cannot be completely eliminated, and some residual magnetic field perpendicular to the recording surface is left in one direction, the polarities are determined such that the direction of a magnetic field generated by the bias magnetic field generator in the erase mode coincides with that of the residual magnetic field. In addition, according to the embodiment, a disk is exemplified as the recording medium used in the optomagnetic recording/reproducing apparatus. However, a medium having other shapes such as a card-like shape may be used in place of the disk.

What is claimed is:

1. An optomagnetic recording/reproducing apparatus, comprising:
   a light source for generating a light beam;
   focusing means for focusing the light beam emitted from said light source;
   a recording medium having a recording surface to be irradiated with the light beam focused by said focusing means;
   pickup means for detecting the light beam from said recording medium;
   bias magnetic field generating means for applying a bias magnetic field onto said recording medium; and
   first magnetic field generating means for generating a first magnetic field, and second magnetic field generating means for generating a second magnetic field, the first and the second magnetic field generating means being associated with components of the recording/reproducing apparatus other than said bias magnetic field generating means, the first and the second magnetic fields being directed in directions opposite to one another onto that region of said recording medium which is irradiated with the light beam for minimizing interference with said bias magnetic field at said region.

2. The apparatus according to claim 1, wherein the surface of said recording medium is composed of a thin film of a magnetic material magnetized in a direction substantially perpendicular to the surface.

3. The apparatus according to claim 1, wherein one of said first and second magnetic field generating means includes a lens actuator for driving said focusing means.

4. The apparatus according to claim 1, wherein one of said first and second magnetic field generating means includes a pickup driver for driving said pickup means.

5. The apparatus according to claim 1, wherein one of said first and second magnetic field generating means includes clamp means for clamping said recording medium at a predetermined position by a magnetic attraction.

6. The apparatus according to claim 1, wherein said recording medium is formed into a disk-like shape having a rotational center thereof.

7. The apparatus according to claim 6, further comprising driving means for rotating said recording medium.

8. The apparatus according to claim 7, wherein one of said first and second magnetic field generating means includes clamp means arranged in said driving means for clamping said recording medium at a predetermined position by magnetic attraction.

9. The apparatus according to claim 7, wherein one of said first and second magnetic field generating means includes a magnetic sensor for detecting a rotational speed of said disc-like recording medium rotated about the rotational center.

10. An optomagnetic recording/reproducing apparatus, comprising:
   a light source for generating a light beam;
   focusing means for focusing the light beam emitted from said light source;
   a recording medium having a recording surface to be irradiated with the light beam focused by said focusing means;
   pickup means for detecting the light beam from said recording medium;
   bias magnetic field generating means for applying a bias magnetic field onto said recording medium;
   lens actuator means for generating a first magnetic field, so as to drive said focusing means, the first magnetic field being applied in a first direction perpendicular to the surface of the recording medium onto that region of the medium which is irradiated with the light beam; and
   magnetic field generating means for generating a second magnetic field so that said first and said second magnetic fields substantially cancel one another, said second magnetic fields being applied in a second direction opposite to said first direction onto said irradiated region of the recording medium.

* * * * *